United States Patent
Pour et al.

(10) Patent No.: US 11,916,198 B2
(45) Date of Patent: Feb. 27, 2024

(54) FAST-CHARGING LITHIUM ION BATTERIES WITH ELECTROLYTES THAT DO NOT REACT ON THE ANODES

(71) Applicant: STOREDOT LTD., Herzeliya (IL)

(72) Inventors: Nir Pour, Herzeliya (IL); Dafna Meron, Herzeliya (IL); Daniel Hirshberg, Herzeliya (IL); Nir Kedem, Herzeliya (IL); Evgenia Llel Kuks, Herzeliya (IL)

(73) Assignee: STOREDOT LTD., Herzeliya (IL)

( * ) Notice: Subject to any disclaimer, the term of this patent is extended or adjusted under 35 U.S.C. 154(b) by 262 days.

(21) Appl. No.: 17/247,851

(22) Filed: Dec. 27, 2020

(65) Prior Publication Data

US 2021/0203002 A1 Jul. 1, 2021

Related U.S. Application Data

(60) Provisional application No. 62/953,614, filed on Dec. 26, 2019.

(51) Int. Cl.
| | | |
|---|---|---|
| *H01M 10/0569* | (2010.01) | |
| *H01M 10/0567* | (2010.01) | |
| *H01M 10/0568* | (2010.01) | |
| *H01M 4/38* | (2006.01) | |
| *H01M 10/0525* | (2010.01) | |

(52) U.S. Cl.
CPC ....... *H01M 10/0569* (2013.01); *H01M 4/386* (2013.01); *H01M 10/0525* (2013.01); *H01M 10/0567* (2013.01); *H01M 10/0568* (2013.01)

(58) Field of Classification Search
CPC ............. H01M 10/0569; H01M 4/386; H01M 10/0525; H01M 10/0567; H01M 10/0568
See application file for complete search history.

(56) References Cited

U.S. PATENT DOCUMENTS

| | | | | |
|---|---|---|---|---|
| 2004/0048157 | A1* | 3/2004 | Neudecker | H01M 4/5825 427/126.3 |
| 2009/0286157 | A1* | 11/2009 | Chen | H01M 4/0421 252/182.1 |
| 2010/0209780 | A1* | 8/2010 | Muldoon | H01M 10/0569 429/339 |
| 2012/0183866 | A1* | 7/2012 | Lee | H01M 4/1393 429/337 |
| 2014/0342249 | A1* | 11/2014 | He | H01M 10/4235 429/188 |
| 2015/0263379 | A1* | 9/2015 | Xiao | H01M 10/052 205/59 |
| 2016/0329613 | A1* | 11/2016 | Kusachi | H01M 4/525 |
| 2019/0245243 | A1* | 8/2019 | Moloy | H01M 10/0569 |

* cited by examiner

*Primary Examiner* — Adam A Arciero
(74) *Attorney, Agent, or Firm* — Reches Patents

(57) ABSTRACT

Fast-charging lithium ion cells are provided, which have electrolytes that do not react with the cell anodes, but instead form a solid-electrolyte interphase (SEI) on the cathodes. Advantageously, such electrolytes improve the performance of the fast-charging cells, and enhance their lifetime and safety. Various electrolyte solutions and lithium ions are proposed to limit electrolyte interactions to the cathodes, or possibly even minimize or prevent these reactions by coating the cathodes. Redox couples may be used to prevent SEI formation on the anode, while promoting SEI formation on the cathode.

21 Claims, 11 Drawing Sheets

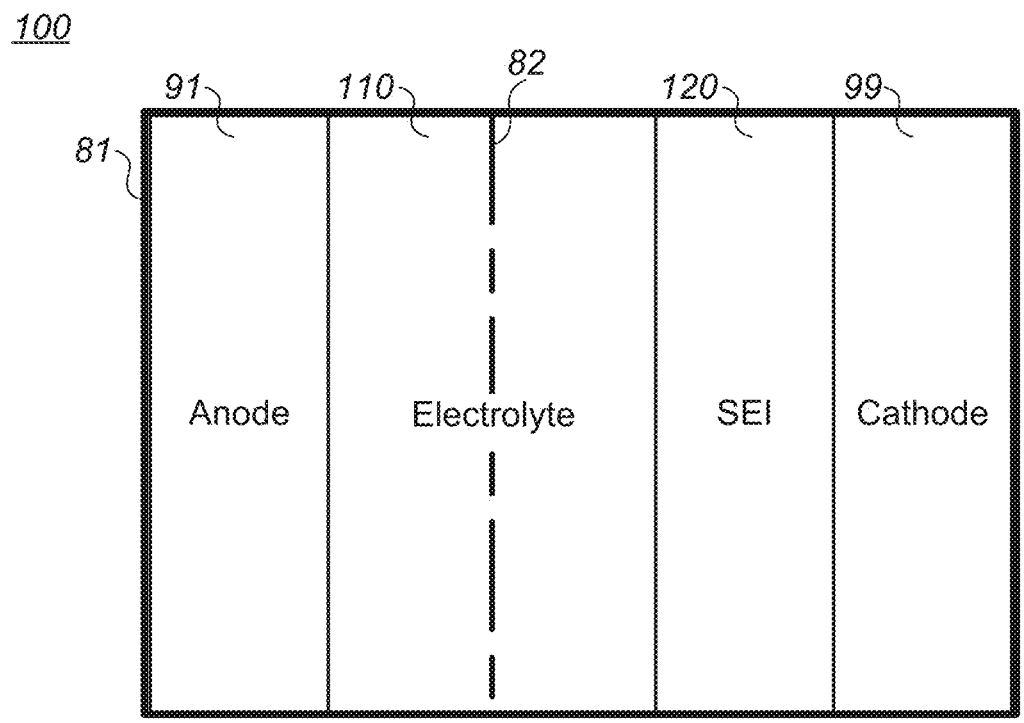
*Figure 1*
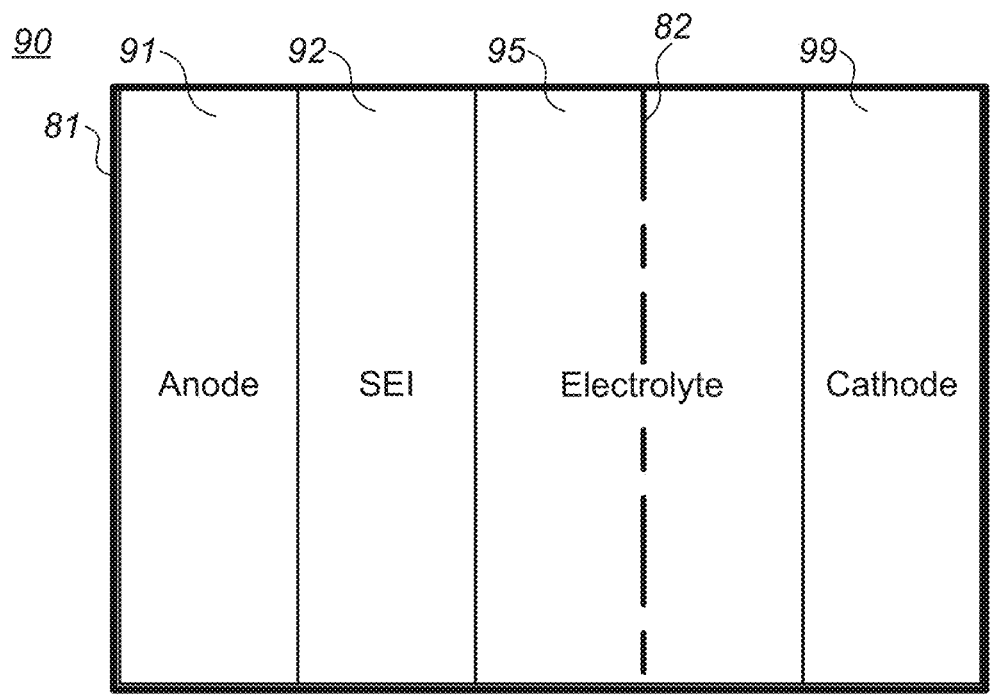
*Figure 2 – Prior art*

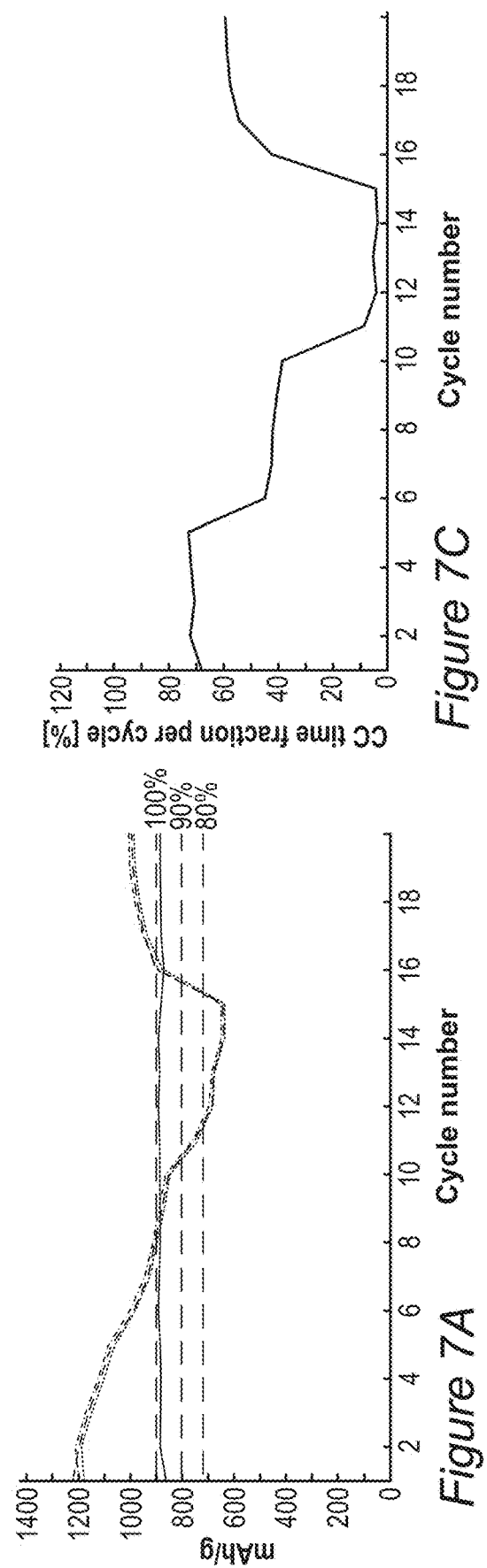

FAST-CHARGING LITHIUM ION BATTERIES WITH ELECTROLYTES THAT DO NOT REACT ON THE ANODES

CROSS REFERENCE

This application claims priority from U.S. provisional patent Ser. No. 62/953,614 filing date Dec. 26, 2019 which is incorporated herein by reference.

BACKGROUND OF THE INVENTION

Technical Field

The present invention relates to the field of energy storage devices, and more particularly, to fast-charging lithium ion batteries.

Discussion of Related Art

Developing a stable electrode with Si as an active material is challenging, due to the fact that it undergoes severe volumetric and physical changes during the cycle life. Some of the ways to stabilize the Si anode is by modifying the Si anode (binder, Si morphology etc.) and/or by adding an SEI-forming additive to the electrolyte solution to form a stable SEI (solid-electrolyte interphase).

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a fast-charging lithium ion cell comprising: at least one anode made of metalloid anode active material comprising at least one of Si, Ge and Sn, at least one, possibly coated, cathode, and electrolyte comprising an electrolyte solution and at least one dissolved lithium salt; wherein: the at least one anode and the at least one cathode are enclosed with the electrolyte and at least one separator within a pouch, and the electrolyte solution is selected to create, at least during a formation stage of the cell, a solid-electrolyte interphase (SEI) upon the at least one cathode rather than on the at least one anode.

One aspect of the present invention provides a method comprising preparing a fast-charging lithium ion cell with at least one anode made of metalloid anode active material comprising at least one of Si, Ge and Sn, at least one cathode, and electrolyte comprising an electrolyte solution and at least one dissolved lithium salt; wherein the electrolyte solution is selected to create, at least during a formation stage of the cell, a solid-electrolyte interphase (SEI) upon the at least one cathode rather than on the at least one anode.

One aspect of the present invention provides a fast-charging lithium-ion battery comprising: at least one anode having anode material that is based on Si, Ge and/or Sn, at least one cathode, electrolyte solution with at least one lithium salt, at least one separator, separating the electrolyte solution between an anode-contacting compartment and a cathode-contacting compartment, and a redox couple in the electrolyte solution, having a first redox pair in the anode-contacting compartment and a second redox pair in the cathode-contacting compartment, wherein the first redox pair is inert with respect to the at least one anode and the second redox pair forms a solid electrolyte interphase (SEI) on the at least one cathode during at least a formation process of the battery.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 1 is a high-level schematic illustration of a fast-charging lithium ion cell, according to some embodiments of the invention;

FIG. 2 illustrates schematically prior art cells;

FIGS. 6A-6D and 7A-7D illustrate, experimentally, advantages of disclosed electrolyte solutions, according to some embodiments of the invention;

DETAILED DESCRIPTION OF THE INVENTION

Figure 3:
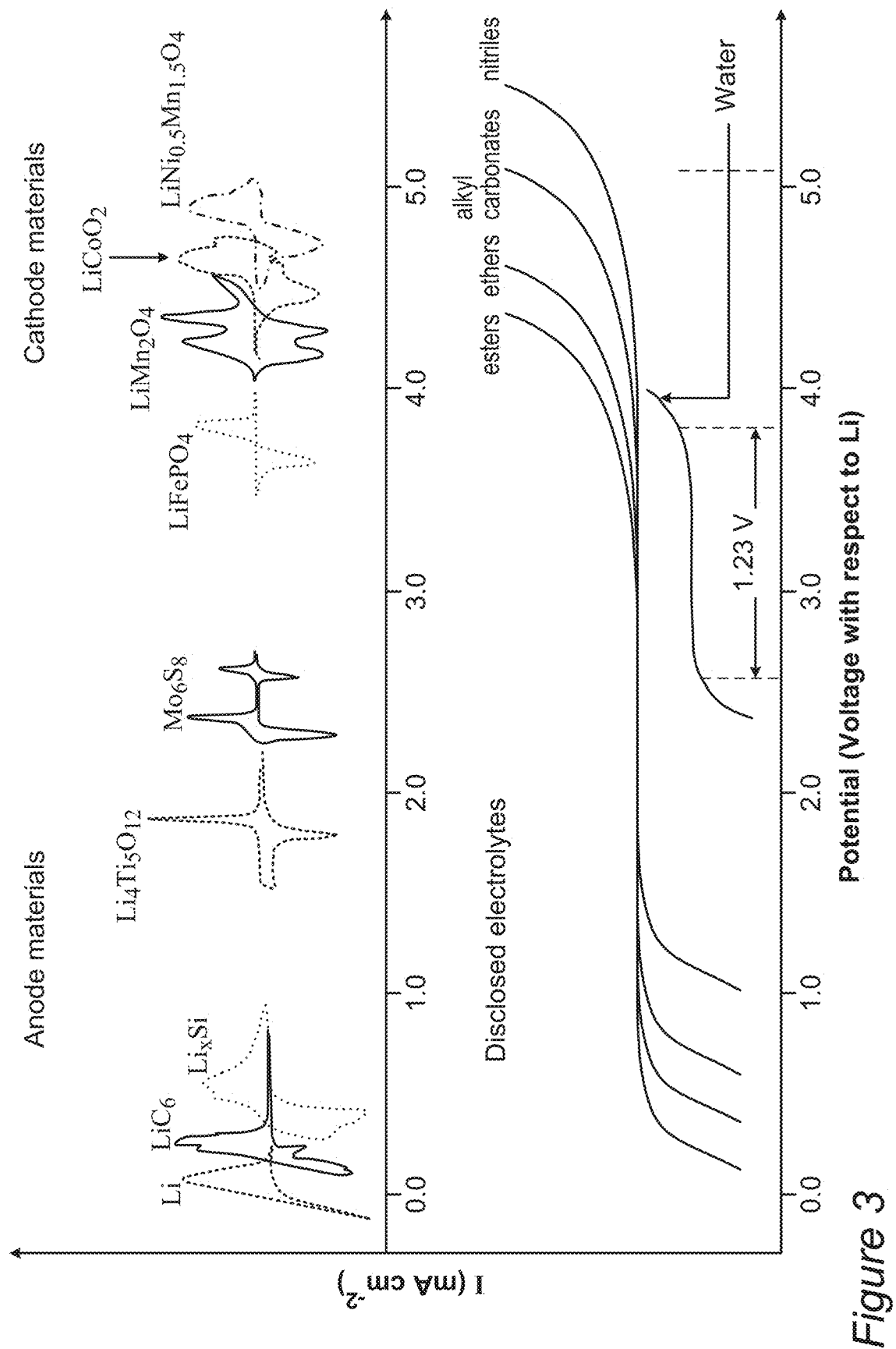
FIG. 3 is a high-level schematic illustration of operational voltage windows of several groups of disclosed electrolyte solutions of electrolytes, compared with the operational voltages of several anode and cathode materials, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanisms for preparing fast charging lithium ion cells, and thereby provide improvements to the technological field of energy storage devices. Fast-charging lithium ion cells are provided, which have electrolytes that do not react with the cell anodes, but instead form a solid-electrolyte interphase (SEI) on the cathodes. Advantageously, such electrolytes improve the performance of the fast-charging cells, and enhance their lifetime and safety. Various electrolyte solutions and lithium ions are proposed to limit electrolyte interactions to the cathodes, or possibly even minimize or prevent these reactions by coating the cathodes. Redox couples may be used to prevent SEI formation on the anode, while promoting SEI formation on the cathode.

FIG. 1 is a high-level schematic illustration of a fast-charging lithium ion cell 100, according to some embodiments of the invention. FIG. 2 illustrates schematically prior art cells 90. As illustrated schematically in FIG. 1, fast-charging lithium ion cell 100 comprises at least one anode 91 made of metalloid anode active material comprising at least one of Si, Ge and Sn, at least one cathode 99, which may in certain embodiments be coated, and electrolyte 110 comprising an electrolyte solution and at least one dissolved lithium salt. Anode(s) 91 and cathode(s) 99 may be enclosed with electrolyte 110 and at least one separator 82 within a cover 81 such as a pouch, and be produced in any of various assembly procedures. The electrolyte solution is selected to create, at least during a formation stage of cell 100, a solid-electrolyte interphase (SEI) 120 upon cathode(s) 99 rather than on anode(s) 91—in contrast to prior art cells 90, illustrated schematically in FIG. 2, in which an SEI 92 is formed by decomposition of prior art electrolyte 95 on anode 91. SEI 120 in disclosed embodiments is different from prior art SEI 92 in its composition and structural features, and may in some embodiments be avoided or reduced significantly through the use of cathode coating—e.g., be selecting the electrolyte solution to be unreactive, at least during a formation stage of cell 100, towards anode(s) 91 and towards coated cathode(s) 99, to prevent or reduce formation of solid-electrolyte interphase (SEI) 120 thereupon. In certain embodiments, no SEI is formed on the anodes. In certain embodiments, SEI is formed on the cathodes. In certain embodiments, no SEI is formed on the anodes or on the cathodes, e.g., by protection of the cathodes by coating(s). When SEI is formed on the cathodes, it may be formed in a controllable manner, e.g., by types and quantities of additives in the electrolyte solution. SEI formation on the cathodes may be carried out on the cathode active material particles or on the whole surface of the cathodes, possibly even on their current collectors. In certain embodiments, cathode coating may be carried out with vanadium species (such as vanadium oxides e.g., $V_2O_4 \rightarrow V_2O_5$, possibly also other vanadium oxides such as VO, $V_2O_3$, $VO_2$ etc.), possibly in a pre-vanadation process of coating the cathodes (see also FIG. 8 below).

The inventors note that conventional electrolyte solutions (used, e.g., with lithium salt $LiPF_6$ to form electrolyte 95) are designed to have high anodic stability, low cathodic stability, and an SEI forming additive. This strategy, which was pivotal to the development of reversible graphite anodes might be detrimental to Si anodes due to the different nature of the volumetric expansion of graphite vs. Si (~10% vs. 300%). Formation and breakdown of SEI 92 on anodes 91 is thought to be a significant reason for low cycle life for cells with Si-based anodes—as in each consecutive cycle the electrolyte solution is reduced to form SEI 92, which is thought to be torn apart during the volumetric changes that are inherent for alloy/conversion type anodes. This process results in recurring reduction, continuous increases of the resistance of anode 91 due to the thickening of SEI film 92, as well as continuous loss of Li ions and cell capacity. These processes then result in a voltage drift, causing the cathode to reach ever higher potentials, and eventually to cell death.

In contrast, disclosed electrolytes 110 may be made of electrolyte solution(s) that have high cathodic stability and a low/medium anodic stability (e.g., as measured by their potential with respect to a lithium electrode reference, and are not reduced by charged anode 91. Accordingly, formation of SEI 92 of anode(s) 91 and/or reduction of the electrolyte solution are avoided, or is at least minimized, preventing the prior art disadvantages noted above. Electrolyte 110 may further comprise cathode SEI forming additive(s), which either or both prevent SEI formation 92 on anode(s) 91 and/or promote SEI formation 120 on cathode(s) 99.

FIG. 3 is a high-level schematic illustration of operational voltage windows of several groups of disclosed electrolyte solutions of electrolytes 110, compared with the operational voltages of several anode and cathode materials, according to some embodiments of the invention.

The data are presented as current fluxes ($mA/cm^2$) in terms of potential, that depicts the voltages with respect to lithium. Non-limiting examples for anode materials (e.g., Li at zero potential, $LiC_6$, $Li_xSi$, $LTO-Li_4T_{15}O_{12}$ and $Mo_6S_8$) and cathode materials (e.g., LFP-based, based on $LiFePO_4$, LMO-based, based on $LiMn_2O_4$, LCO-based, based on $LiCoO_2$ and LNMO-based, based on $LiNi_{0.5}Mn_{1.5}O_4$)—are illustrated by cyclic voltammogram or galvanostatic data as provided by Xu and Wang 2016, Batteries: Widening voltage windows. Nature Energy. 1(10): 1038—that indicate their operative potentials. It is noted that in fast-charging applications, hydrate melts (e.g., $Li(TFSI)_{0.7}$ $(BETI)_{0.3} \cdot 2H_2O$—mixture of two lithium salts, with minimal water content) may be less effective high viscosity and low conductivity).

Disclosed electrolyte solutions comprise any esters, ethers, alkyl carbonates and/or nitriles, as non-limiting examples, which have decomposition potentials that are comparable to the working potentials of cathode materials, e.g., between 4-5V.

Figure 4:
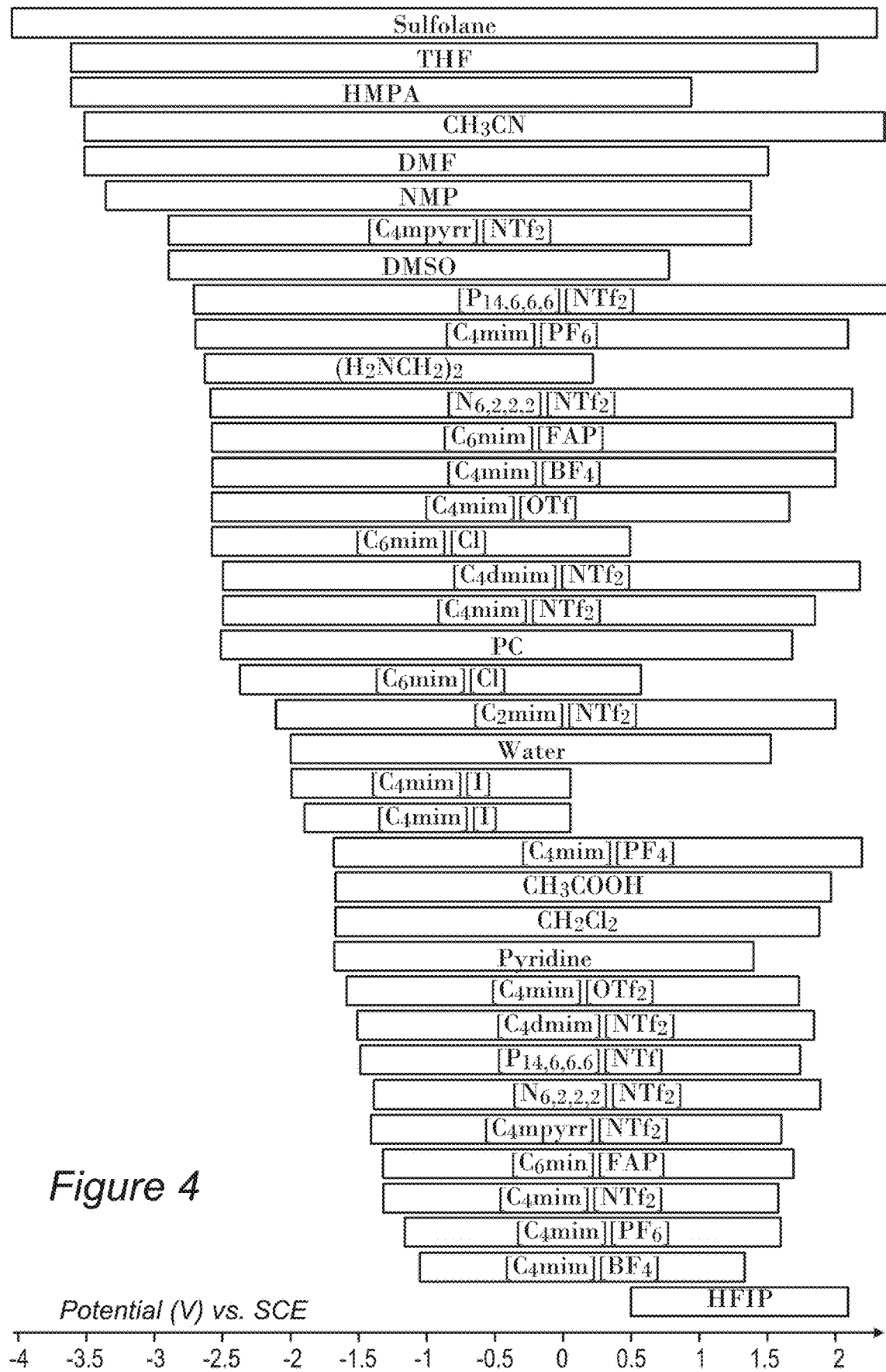
FIG. 4 is a high-level schematic illustration of operational voltage windows of various optional electrolyte solutions in disclosed electrolytes, according to some embodiments of the invention.

FIG. 4 is a high-level schematic illustration of operational voltage windows of various optional electrolyte solutions in disclosed electrolytes 110, according to some embodiments of the invention. The data is based on Luca et al. 2015, Catalysis by electrons and holes: formal potential scales and preparative organic electrochemistry, Org. Chem. Front., 2015, 2, 823—which was measured mainly for carbon-based anodes and platinum-based cathodes, and in solvents. Potential windows for some recurring candidates were measured in Luca 2015 under different conditions (e.g., vacuum dried vs. atmospheric—as water association with the ionic liquids narrow their respective potential windows). For example, any of the following electrolyte solutions or their combinations may be used in electrolyte 110: Sulfolane (tetramethylene sulfone), THF (tetrahydrofuran), HMPA (hexamethylphosphotriamide), $CH_3CN$ (acetonitrile), DMF (N,N-dimethylformamide), NMP (N-methylpyrrolidone), [$C_4$mpyrr][$NTf_2$] (N-butyl-N-methyl-pyrrolidinium bis(trifluoromethylsulfonyl)imide), DMSO (dimethyl sulfoxide), [$P_{14,6,6,6}$][$NTf_2$] (tris(P-hexyl)tetradecylphosphonium, trifluorotris(pentafluoroethyl)phosphate), [$C_4$mim][$PF_6$] (1-butyl-3-methylimidazolium hexafluorophosphate), $(H_2NCH_2)_2$, [$N_{6,2,2,2}$][$NTf_2$] (N-hexyltriethylammonium bis(trifluoromethylsulfonyl)imide), [$C_6$mim][FAP] (1-hexyl-3-methylimidazolium tris(perfluoroethyl)trifluorophosphate), [$C_4$mim][$BF_4$] (1-butyl-3-methylimidazolium tetrafluoroborate), [$C_4$mim][OTf] (1-butyl-3-methylimidazolium trifluoromethylsulfonate), [$C_6$mim][Cl] (1-hexyl-3-methylimidazolium chloride), [$C_4$dmim][$NTf_2$] (1-butyl-3-methylimidazolium bis(trifluoromethylsulfonyl)imide), [$C_4$mim][$NTf_2$] (1-butyl-3-methylimidazolium bis(trifluoromethylsolfonyl)imide), PC (propylene carbonate), [$C_2$mim][$NTf_2$] (1-ethyl-3-methylimidazolium bis(trifluoromethylsulfonyl)imide), [$C_4$mim][I] (1-hexyl-3-methylimidazolium iodide), Pyridine, $CH_3COOH$ (acetic acid), $CH_2Cl_2$ (dichloromethane), HFIP (hexafluoro-2-propanol).

The listed solvents, ions of the respective ionic liquids and poly-ethers, are illustrated below (DME denotes 1, 2-dimethoxyetane, Diglyme denotes diethylene glycol dimethyl ether, Triglyme denotes triethylene glycol dimethyl ether, Tetraglyme denotes tetraethylene glycol dimethyl ether, and DEE denotes 1,2-diethoxyethane):

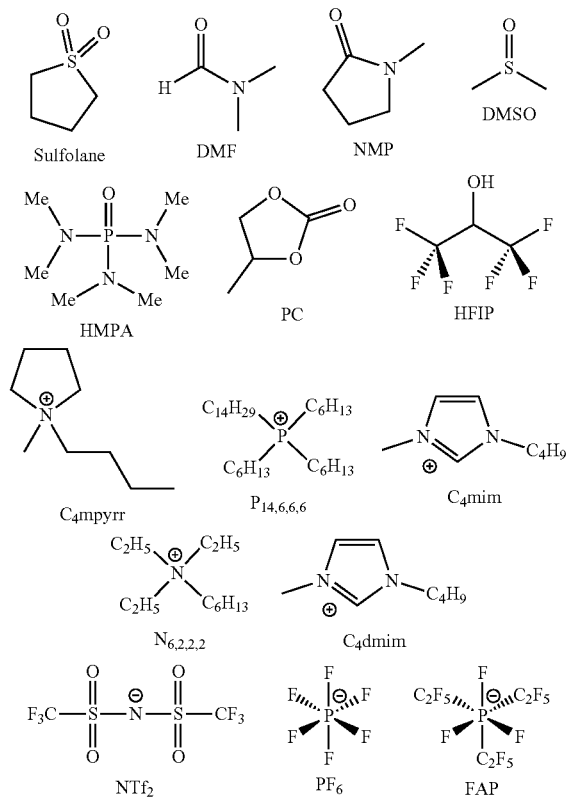

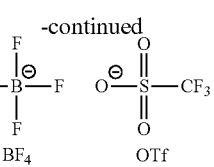

-continued

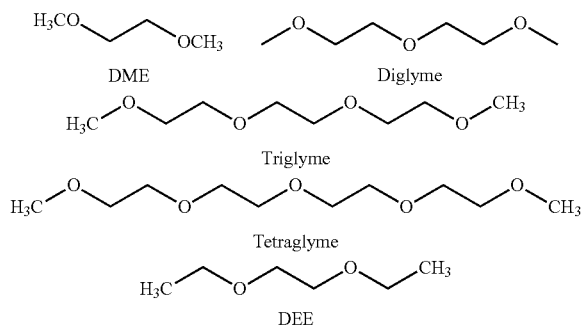

Non-limiting examples for disclosed electrolyte solutions comprise any of the following:

Sulfolane solution, with 1M LiTFSI (lithium bis(trifluoromethanesulfonyl)imide);

Sulfolane solution, with 1M LiBOB (lithium bis(oxalato) borate);

Sulfolane solution, with 1M LiTFSI+20 mM $LiPF_6$;

1:1 Sulolane:Triglyme solution, with 0.9M LiTFSI and 0.1M LiBOB;

1:3 Sulfolane:Triglyme solution, with 1M LiTFSI; NMP with 1M LiTFSI;

1:1 NMP:Sulfolane solution, with 1M LiTFSI;

1:1 DME:Sulfolane solution, with 1M LiTFSI+1% LiFOB (lithium difluoro(oxalato)borate); and/or 1:9 to 1:1 Tetraglyme: Sulfolane solution, with 1M LiTFSI; and 1,2-diethoxyethane (DEE).

A range of additives may be added to any of the disclosed electrolyte solutions, to support SEI formation on the cathode. The additives are noted together with their oxidation potentials compared to $Li/Li^+$, which are all close to the cathode potential.

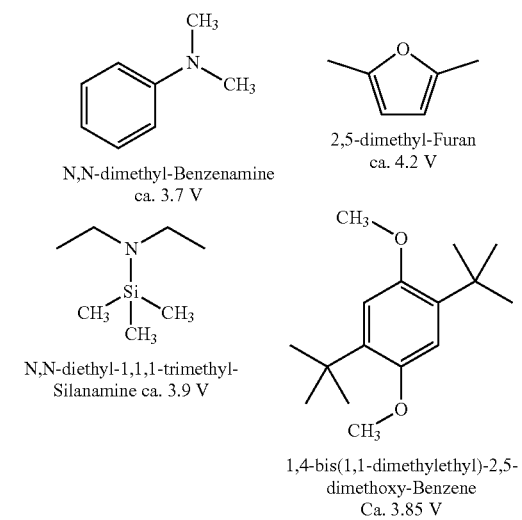

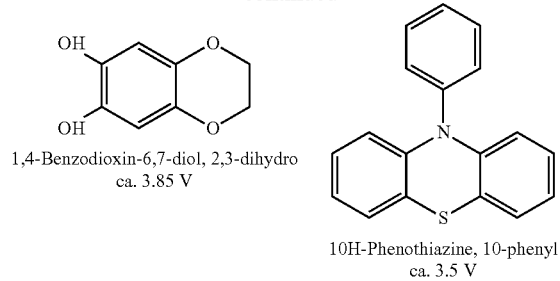

1,4-Benzodioxin-6,7-diol, 2,3-dihydro
ca. 3.85 V

10H-Phenothiazine, 10-phenyl
ca. 3.5 V

In certain embodiments, the electrolyte solution may comprises at least one additive that has an oxidation potential of 3.0V or more with respect to Li/Li$^+$. In certain embodiments, the electrolyte solution may comprises at least one additive that has an oxidation potential of 3.4V or more with respect to Li/Li$^+$.

Figure 5A:
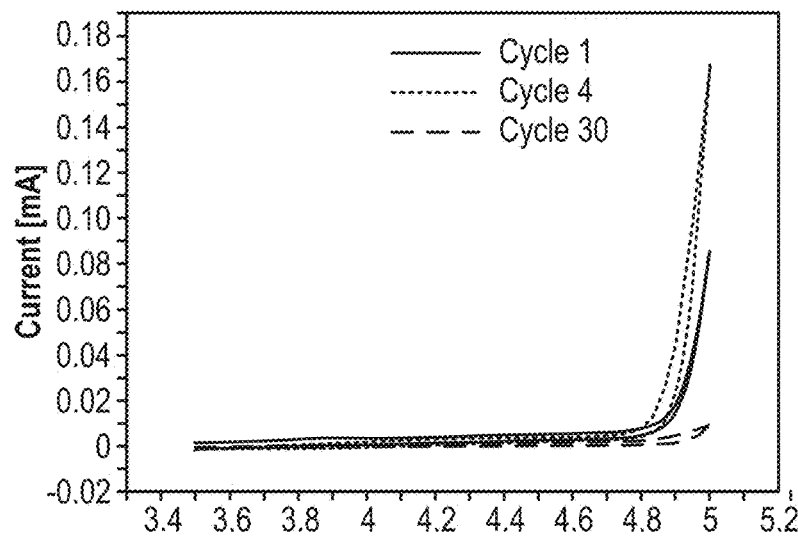
FIG. 5A-5C provide experimental results for fast-charging lithium ion cells with disclosed electrolyte solutions, according to some embodiments of the invention.
Figure 5B:
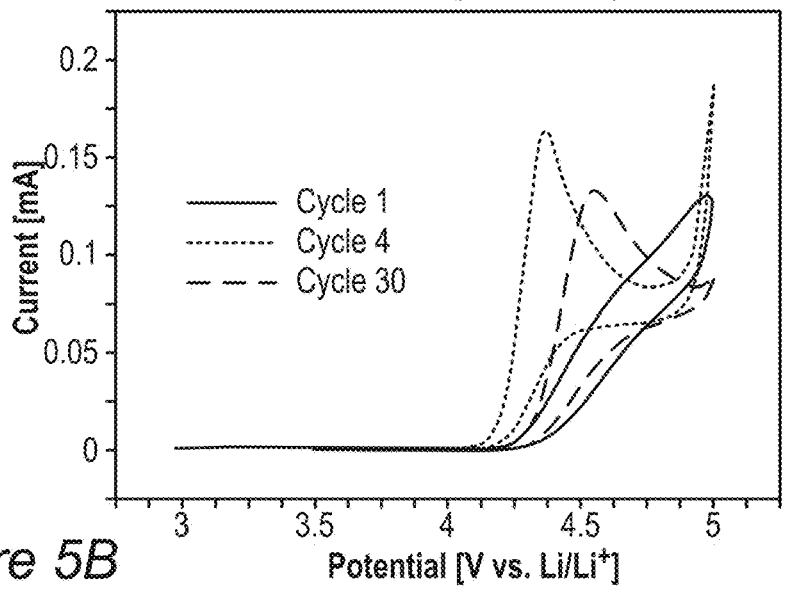
Figure 5C:
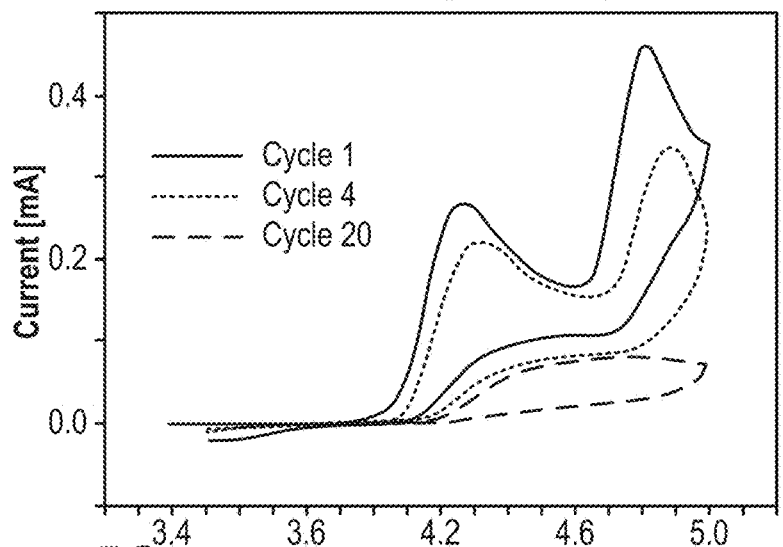

FIG. 5A-5C provide experimental results for fast-charging lithium ion cells with disclosed electrolyte solutions, according to some embodiments of the invention. FIG. 5A provides current-potential curves illustrating the electrochemistry during oxidation (anodic) behavior of a baseline electrolyte solution (30 wt % VC, 35 wt % EB—ethyl butyrate, 35 wt % BA—butyl acetate, 1M LiPF$_6$ salt) with platinum electrode in a three electrodes flooded cell configuration; while FIGS. 5B and 5C illustrates current-potential curves for similar conditions, except the addition of RS-460 (in FIG. 5B) and diphenyl selenide (FIG. 5C) to the electrolyte solution. Accordingly, the inventors note that the additives change the electrochemical behavior of the baseline electrolyte during oxidation, providing an additional irreversible oxidation peak which indicates an addition oxidation reaction. The inventors suggest herein, without being bound by theory, that the addition oxidation reaction passivates the cathodes as disclosed herein.

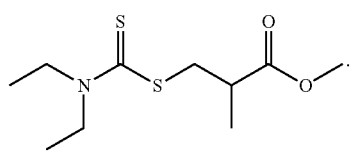

RS-460

It is noted that additives and electrolyte compositions may be used as disclosed in U.S. patent application Ser. No. 16/525,627, incorporated herein by reference in its entirety.

In follow-up experiments, electrolytes 100 composed of various electrolyte solutions, various lithium salts and additives are to be tested in a range of cell types (half cells with reference electrodes, and full cells) with respect to the electrolyte chemical reactions, cell operation kinetics, formation of SEI 120, cell safety, cycling lifetime of the cells at regular and fast charging rates, structural changes in anodes and cathodes during operation, and so forth. For example, the following electrolyte solutions may be used: THF, Sulfolane, 1,3 dioxolane (1,3 DoL), Dimethoxyethane (DME), Diethylene glycol dimethyl ether (diglyme), Triethylene glycol dimethyl ether (triglyme), Tetraethylene glycol dimethyl ether "tetraglyme" (the latter three and sulfolane having high boiling temperatures which promote cell safety, 162° C., 216° C., 275° C. and 285° C., respectively), Hexane, 2-MeTHF, Tetramethyltetrahydrofuran (TMTHF), Diethyl ether, Di-butyl ether (DBE), Di-pentyl ether (DPE), Cyclopentyl methyl ether (CPME), 1-ethyl-3-methyl imidazolium (EMI), Hexamethelphosphoric triamide (HMPA), Tetrahydrothiophene, as well as various poly-ethers such as DME and di-, tri- and tetra-glyme. Additives such as any of N,N-dimethyl-Benzenamine, 5-dimethyl-Furan, N,N-diethyl-1,1,1-trimethyl-Silanamine, 1,4-bis(1,1-dimethylethyl)-2,5-dimethoxy-Benzene, 1,4-Benzodioxin-6,7-diol, 2,3-dihydro and/or 10H-Phenothiazine, 10-phenyl may also be used. In certain embodiments, the following lithium salts may be used: LiPF$_6$, LiClO$_4$, LiFSI, LiTFSI, LiTDI, LiBOB and LiFOB. In various embodiments, any of RAFTs (reversible addition fragmentation chain transfer agents), Di-Phenyls-Si/SE and Thianthrene may be used as additives. Any of the additives disclosed in U.S. patent application Ser. Nos. 16/291,031 and 16/525,627, incorporated herein by reference in their entirety, may be used as additive in electrolyte 100.

In certain embodiments, the cathode material may be NMC (in any of its formulations, e.g., NMC 622 or NMC 811), or possibly any of the variety of available cathode active materials.

FIGS. 6A-6D and 7A-7D illustrate, experimentally, advantages of disclosed electrolyte solutions, according to some embodiments of the invention.

FIGS. 6A-6D provide data comparing three electrodes flooded cells with a platinum electrode and lithium as the counter and reference electrode, comparing a baseline electrolyte (30% VC, 35% BA, 35% EB, 1M LiPF$_6$) versus DEE (1,2-diethoxyethane) and 1M LiFSI (Lithium bis(fluorosulfonyl)imide).

Figure 6A:
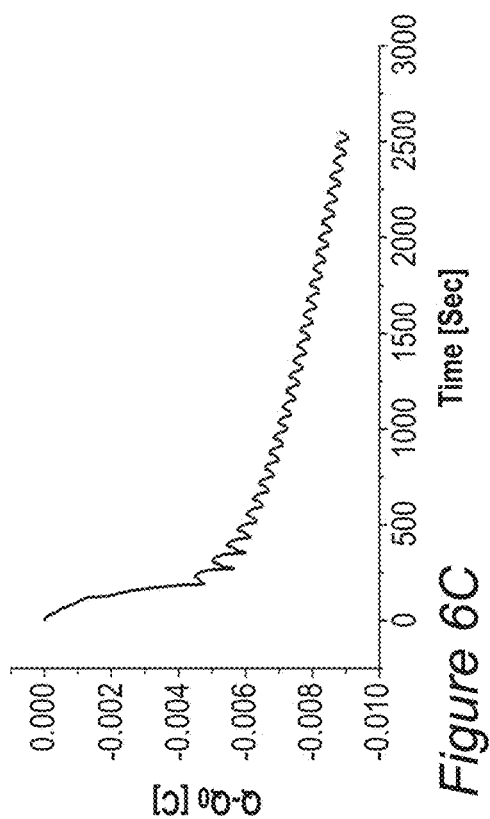
Figure 6C:
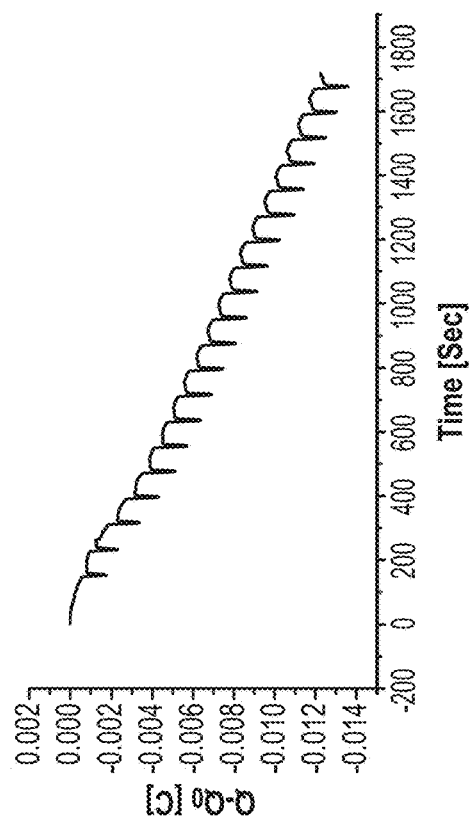
Figure 6B:
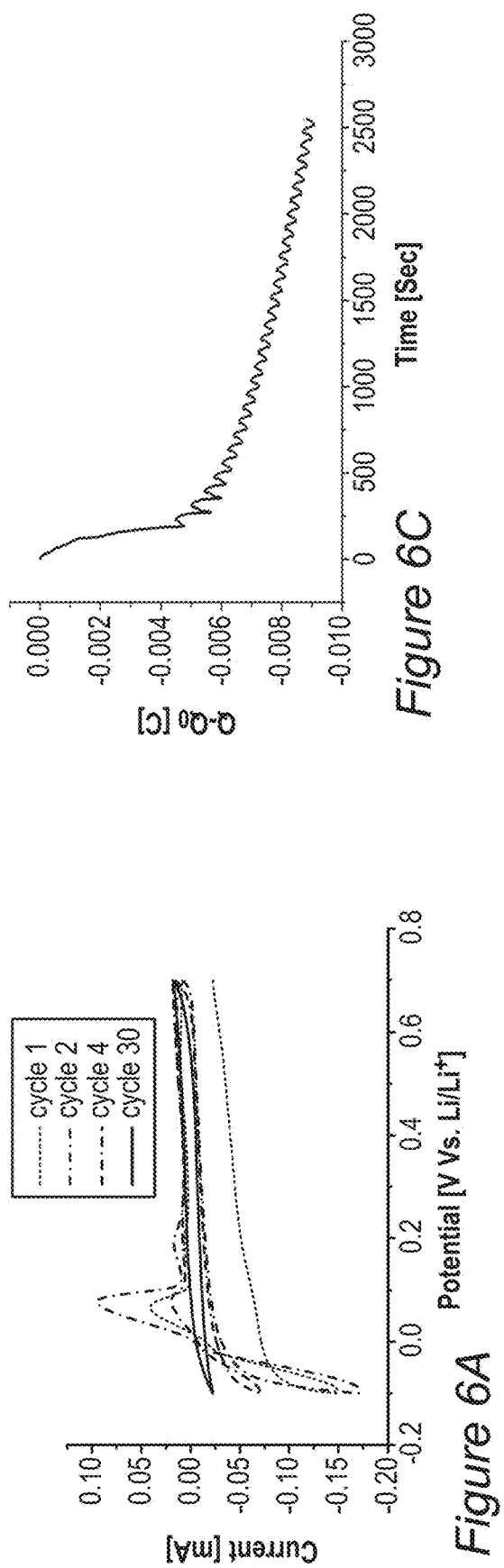
Figure 6D:
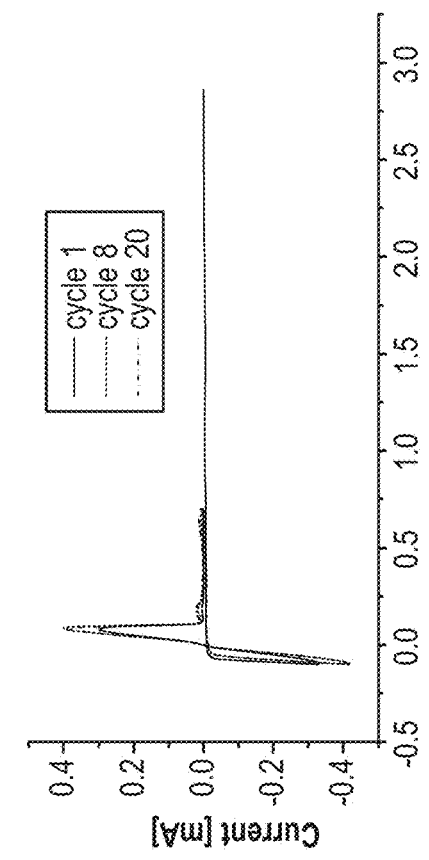

FIGS. 6A and 6B provide graphs for current versus potential during individual cycles 1, 2, 4, and 30 (using cyclic voltammetry of the potentio-dynamic behavior, at a scan rate of 20 mV/s), for flooded cells without and with DEE and LiFSI, respectively. FIGS. 6C and 6D provide graphs for Q-Q$_0$ versus time, at a scan rate of 20 mV/s, for flooded cells with baseline electrolyte and with DEE and LiFSI, respectively.

Table 1 summarizes the differences in performance and the advantages provided by DEE and LiFSI electrolyte In particular, using the additives yielded higher reversibility of Li, higher current values, more charge transfer per cycle, and smaller normalized charge parameter (charge slope divided by charge scale).

TABLE 1

| Improved performance in the flooded cell experiments | | | | |
|---|---|---|---|---|
| Electrolyte | Decrease in Li deposition/ dissolution currents (%) | Current scale (mA) | Charge slope (mC/ cycle) | Charge scale (mC) | Normalized charge parameter (from cycle 3 to 13) |
| Baseline | Very large decrease (down to 0) | 0-0.09 | −0.16 | 0.26 | 0.62 |
| DEE and 1M LiFSI | −1.3% | 0.39 | −0.56 | 1.33 | 0.42 |

The data in Table 1 indicate that although the charge slope is higher when using DEE and LiFSI, the normalized charge parameter is lower, indicating higher performance of the anode and high potential cycling lifetime. In more detail, (i) the smaller decrease in Li deposition/dissolution currents (with the baseline the currents totally disappear while with the DEE they only decreases by 1.3%, indicating higher electrochemical activity) indicates that disclosed electrolyte increase Li reversibility and reduce damage on the platinum anode side (in prior art, possibly associated with increasing resistivity, e.g., by film formation)); the higher current scale indicates a faster kinetics of the charge transfer reaction of Li+ to Li; (iii) the higher charge slope and higher charge scale indicate that the charge losses in the total process are larger when using the additives; however (iv) the smaller normalized charge parameter indicates smaller losses of charge with respect to the total charge that is passes in the reaction.

Figure 7D:
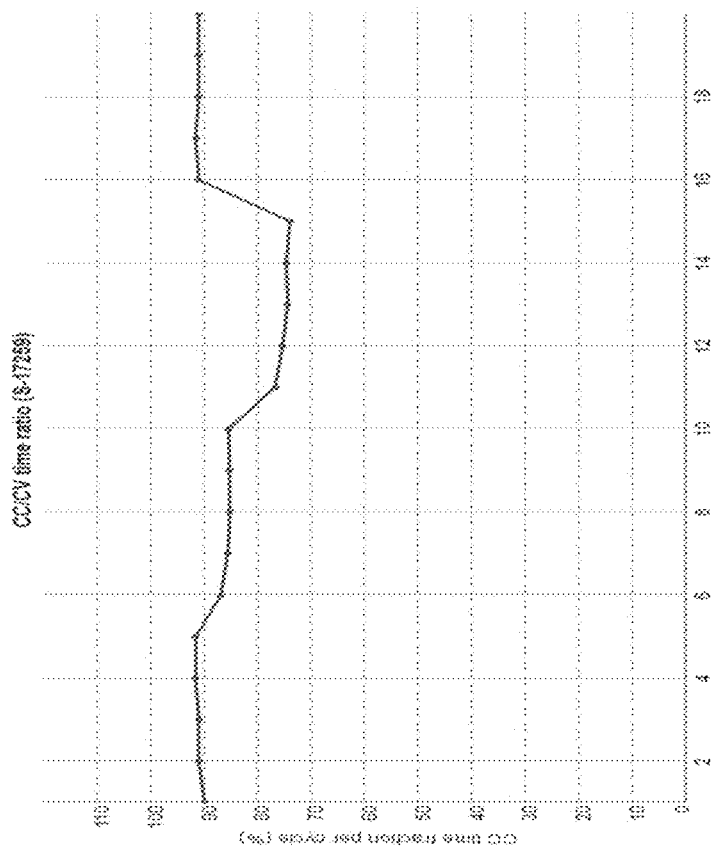
Figure 7B:
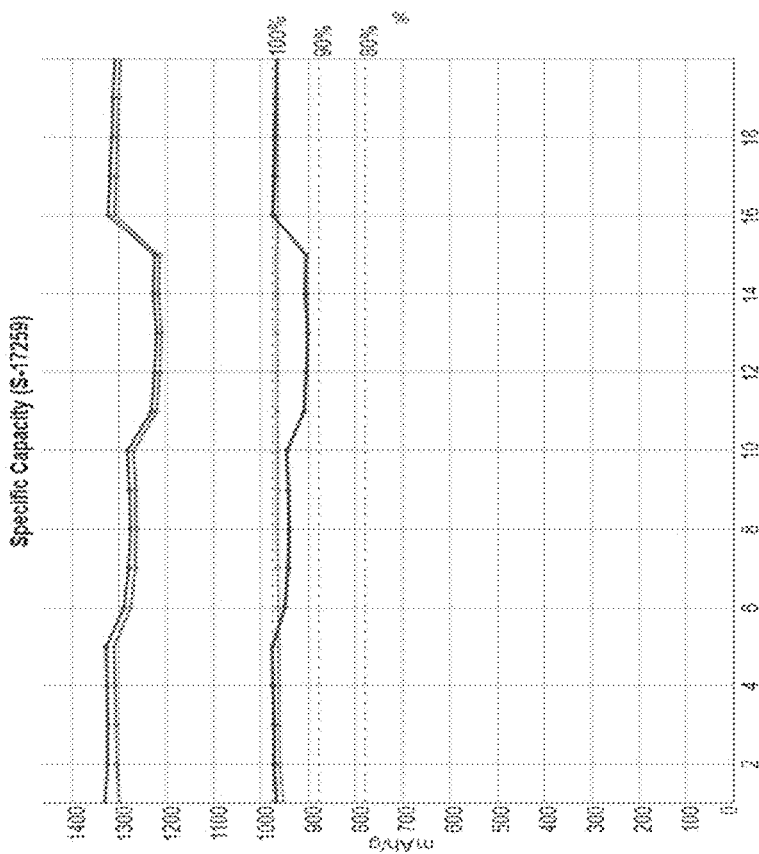

FIGS. 7A-7D provide data comparing half-cells with anodes having Si-based anode material, and lithium electrodes—having baseline electrolyte versus such cells having DEE as electrolyte, with 1M LiFSI (Lithium bis(fluorosulfonyl)imide). FIGS. 7A and 7B provide graphs comparing the relation between the specific capacity of the cells with baseline electrolyte and with DEE electrolyte with LiFSI, respectively. The graphs are shown for three charging rates—0.1 C, 1 C and 5 C that are applied during cycles 0-5 (0.1 C), cycles 6-10 (1 C), cycles 11-15 (5 C) and cycles 16-18 (0.1 C). FIGS. 7C and 7D provide graphs comparing the relation between the CC/(CC+CV) time fraction ratio for the cells with baseline electrolyte and with DEE and 1M LiFSI electrolyte, respectively. Accordingly, using the additives yielded higher first cycle efficiency, much higher rate capability and higher CC/(CC+CV) time fraction ratio. Advantageously, the data indicate that using DEE as electrolyte with LiFSI additive is better suitable for anode function, stability and safety in fast charging applications.

In various embodiments, LiTFSI, LiBOB and LiFOB may also be used as additives to the DEE electrolyte. LiTFSI, LiBOB and LiFOB showed slightly lower performance in comparison to the LiFSI, under the specific experimental conditions.

Figure 8:
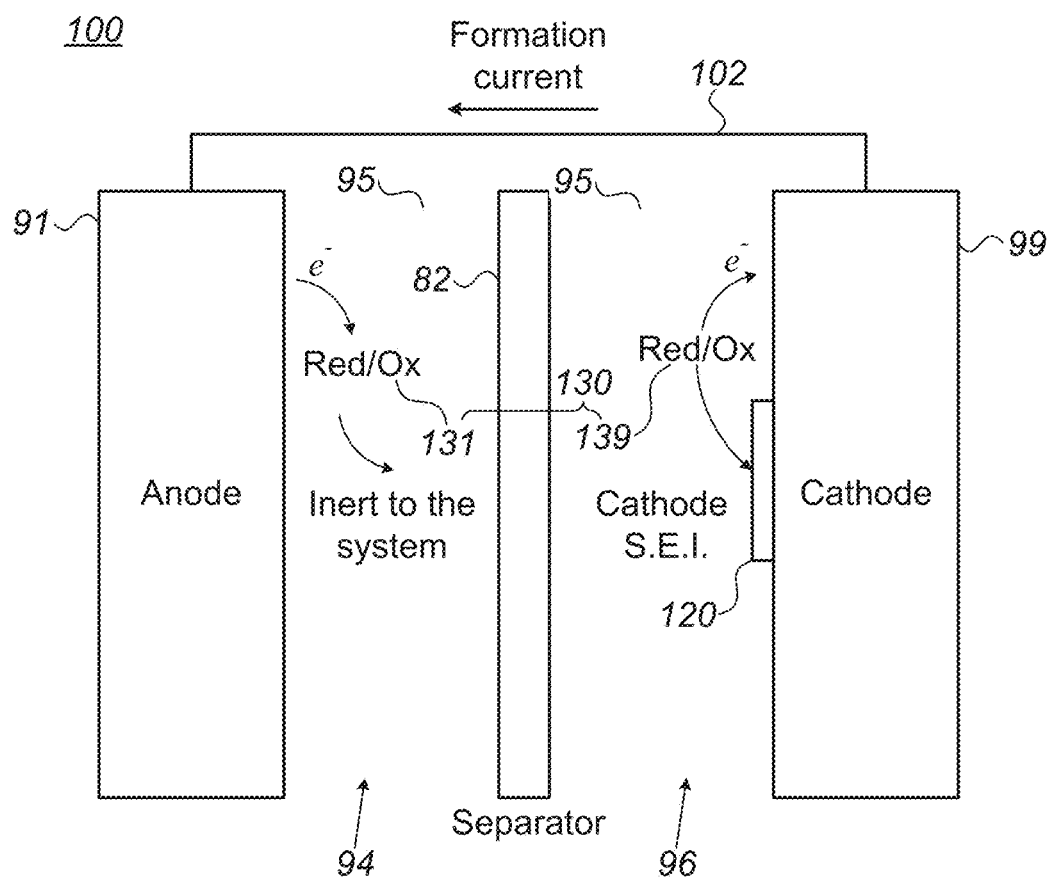
FIG. 8 is a high-level schematic illustration of a fast-charging lithium-ion battery, according to some embodiments of the invention.

FIG. 8 is a high-level schematic illustration of a fast-charging lithium-ion battery 100, according to some embodiments of the invention. Fast-charging lithium-ion battery 100 comprises at least one anode 91 having anode material that is based on Si, Ge and/or Sn, at least one cathode 99, electrolyte solution 95 with at least one lithium salt, at least one separator 82, separating the electrolyte solution between an anode-contacting compartment 94 and a cathode-contacting compartment 96, and a redox couple 130 in the electrolyte solution, having a first redox pair 131 in anode-contacting compartment 94 and a second redox pair 139 in cathode-contacting compartment 96. First redox pair 131 may be inert with respect to anode(s) 91 and its respective anode material, and second redox pair 139 may form a solid electrolyte interphase (SEI) 120 on cathode(s) 99 during at least a formation process 102 of battery 100. Formation process 102 comprises one or few slow cycles of charging and discharging battery 100 typically at rates below 1 C (e.g., a first cycle of charging at step-wise increasing low current and discharge at C/5, followed by 1-4 additional cycles with charging and discharging of the cells at 1 C rates, see, e.g., U.S. Patent Application Publication No. 20190074704, incorporated herein by reference in t entirety) that are carried out in the battery production facility, prior to providing the batteries for operation by users.

In certain embodiments, redox couple 130 may comprise vanadium, with first redox pair 131 comprising $V^{3+}$ and $V^{2+}$ and second redox pair 139 comprising $V^{4+}$ and $V^{5+}$. Advantageously, vanadium has soluble species in organic solvents forming electrolyte solution 95 and has several oxidations states that can be used to form both redox pairs 131, 139, staying inert with respect to the anode active material, as well as insoluble complexes formed by its higher +5 oxidation state, that may form SEI on cathode(s) 99. In various examples, redox couple 130 may comprise compounds used in flow batteries.

Advantageously, redox couple 130 in electrolyte solution 95 may be used to build the SEI on cathode(s) 99 during formation stage 120 without using up energy stored in the electrodes (anode(s) 91 and/or cathode(s) 99) and without reducing the amount of usable lithium ions and the capacity of battery 100.

In various embodiments, additives disclosed in Table 2 may be used with disclosed electrolyte, e.g., with DEE electrolytes. Additives may be used, without being bound by theory, to stabilize cathodes (denoted "C") or to serve as the redox couple (denoted "R") and/or as fire retardant (denoted "F"). The oxidation potentials of the respective additives with respect to Li/Li+ are provided under column "$V_{ox}$".

TABLE 2

Electrolyte additives.

| CAS name | Use | $V_{ox}$ |
|---|---|---|
| 1,1'-Biphenyl | C | 4.68 |
| 1,1':2',1''-Terphenyl | C | 4.59 |
| 1,1':3',1''-Terphenyl | C | 4.68 |
| 2,2'-Bithiophene | C | 4.13 |
| 2,2':5',2''-Terthiophene | C | 3.79 |
| N-(triphenylphosphoranylidene)-Benzenamine | C | 3.62 |
| 1,1'-(methylenedi-4,1-phenylene)bis-1H-Pyrrole-2,5-dione | C | 4.93 |
| 1,1'-[(1-methylethylidene)bis(4,1-phenyleneoxy-4,1-phenylene)]bis-1H-Pyrrole-2,5-dione | C | 4.52 |
| N,N-dimethyl-Benzenamine | C | 3.67 |
| Methoxy-Benzene | C | 4.69 |
| (methylthio)-Benzene | C | 4.43 |
| 1-(2-methylphenyl)-Tricyclo[3.3.1.13,7]decane | C | 4.95 |
| 1-(3-methylphenyl)-Tricyclo[3.3.1.13,7]decane | C | 4.90 |
| 1-(4-methylphenyl)-Tricyclo[3.3.1.13,7]decane | C | 4.81 |
| Furan | C | 4.99 |
| 2-methyl-Furan | C | 4.64 |
| 2,5-dimethyl-Furan | C | 4.28 |
| Thiophene | C | 5.05 |
| 2-methyl-Thiophene | C | 4.72 |
| 2,5-dimethyl-Thiophene | C | 4.40 |
| tris(2,3,4,5,6-pentafluorophenyl)-Borane | C | 5.92 |
| 2,3-dihydro-Thieno[3,4-b]-1,4-dioxin | C | 4.57 |
| 4-(trifluoromethyl)-1,3-Dioxolan-2-one | C | 7.44 |
| 4-(1,1,2,2,3,3,4,4,4-nonafluorobutyl)-1,3-Dioxolan-2-one | C | 7.41 |
| 4-(1,1,2,2,3,3,4,4,5,5,6,6,6-tridecafluorohexyl)-1,3-Dioxolan-2-one | C | 7.43 |
| 4-(1,1,2,2,3,3,4,4,5,5,6,6,7,7,8,8,8-heptadecafluorooctyl)-1,3-Dioxolan-2-one | C | 7.43 |
| 2,4,6-trimethoxy-Boroxin | C | 6.84 |
| Butanedinitrile | C | 7.96 |
| 1,1,1-trimethyl-Silanol, 1,1',1''-phosphite | C | 4.31 |
| bis[ethanedioato(2-)-κO1,κO2]-Borate(1-), (T-4)-(9CI) | C | 6.38 |
| N,N-diphenyl-Benzenamine | C | 3.74 |
| 1,4-Benzodioxin-6,7-diol, 2,3-dihydro | C | 3.86 |
| [ethanedioato(2-)-κO1,κO2]difluoro-Borate(1-), (T-4)- | C | 5.91 |
| 1,3,2-Dioxathiolane,2,2-dioxide | C | 7.22 |
| 2,2,2-trifluoro-Ethanol,, carbonate (2:1) | C | 7.49 |
| 1,1,1-trimethyl-Silanol, 1,1',1''-triester with boric acid (H3BO3) | C | 5.81 |
| 1,1,1-trimethyl-Silanol, 1,1',1''-phosphate | C | 5.98 |
| triphenyl-Phosphine | C | 4.12 |
| P,P-diphenyl-Phosphinous acid, ethyl ester | C | 4.26 |
| Phosphorous acid, triethyl ester | C | 4.72 |
| 1,3,5-Benzenetriol | C | 4.65 |
| tris(2,3,4,5,6-pentafluorophenyl)-Phosphine | C | 5.28 |
| Silicic acid (H4SiO4), tetraethyl ester | C | 6.04 |
| N,N-diethyl-1,1,1-trimethyl-Silanamine | C | 3.90 |
| trimethyl ester Boric acid (H3BO3), | C | 6.56 |
| 1,4-bis(1,1-dimethylethyl)-2,5-dimethoxy-Benzene | R | 3.84 |
| 1,5-bis(1,1-dimethylethyl)-2,3-dimethoxy-Benzene | R | 3.98 |
| 4,6-bis(1,1-dimethylethyl)-1,3-Benzodioxole | R | 4.16 |
| 5,7-bis(1,1-dimethylethyl)-2,3-dihydro-1,4-Benzodioxin | R | 4.03 |
| 4-(1,1-dimethylethyl)-1,2-dimethoxy-Benzene | R | 4.19 |

TABLE 2-continued

Electrolyte additives.

| CAS name | Use | $V_{ox}$ |
|---|---|---|
| 1,4-bis(1,1-dimethylethyl)-2,5-bis(2,2,2-trifluoroethoxy)-Benzene | R | 4.28 |
| P,P'-[2,5-bis(1,1-dimethylethyl)-1,4-phenylene] P,P,P',P'-tetraethyl ester Phosphoric acid | R | 4.58 |
| 1,1'-(dimethoxysilylene)bis-Benzene | R | 5.21 |
| 1,1'-(2,5-dimethoxy-1,4-phenylene)bis[1,1-bis(1-methylethyl)-Phosphine oxide | R | 4.37 |
| 1,4-dimethoxy-2,5-bis(trimethylsilyl)-Benzene | R | 3.91 |
| 2,2,6,6-tetramethyl-1-Piperidinyloxy | R | 3.84 |
| 4-cyano-2,2,6,6-tetramethyl-1-Piperidinyloxy | R | 4.07 |
| 3-cyano-2,2,5,5-tetramethyl-1-Pyrrolidinyloxy | R | 4.12 |
| 10-methyl-10H-Phenothiazine | R | 3.39 |
| 3,7-dibromo-10-ethyl-10H-Phenothiazine | R | 3.66 |
| 10-ethyl-10H-Phenothiazine-3,7-dicarbonitrile | R | 4.11 |
| 10-ethyl-10H-Phenoxazine-3,7-dibromo | R | 3.61 |
| 10-ethyl-10H-Phenoxazine-3,7-dicarbonitrile | R | 4.01 |
| 4-bromo-N-(4-bromophenyl)-N-ethyl-Benzenamine | R | 3.86 |
| 4,4'-(ethylimino)bis-Benzonitrile | R | 4.37 |
| 3,6-dibromo-9-ethyl-9H-Carbazole | R | 4.25 |
| 9-ethyl-9H-Carbazole-3,6-dicarbonitrile | R | 4.72 |
| 3-chloro-10-ethyl-10H-Phenothiazine | R | 3.59 |
| 10-(1-methylethyl)-10H-Phenothiazine | R | 3.61 |
| 1-(10H-phenothiazin-10-yl)-Ethanone | R | 4.40 |
| 10H-Phenothiazine | R | 3.52 |
| 3,7-dichloro-10H-Phenothiazine | R | 3.67 |
| 3,7-dibromo-10H-Phenothiazine | R | 3.65 |
| 3,7-bis(trifluoromethyl)-10H-Phenothiazine | R | 3.91 |
| N-phenyl-Benzenamine | R | 3.88 |
| 10-(1,1-dimethylethyl)-10H-Phenothiazine | R | 3.78 |
| 10-phenyl-10H-Phenothiazine | R | 3.52 |
| 4,5,6,7-tetrafluoro-2-(2,3,4,5,6-pentafluorophenyl)-1,3,2-Benzodioxaborole | R | 5.59 |
| P-methyl-dimethyl ester Phosphonic acid | F | 6.32 |
| P-ethyl-diethyl ester Phosphonic acid | F | 6.32 |
| triphenyl ester Phosphoric acid | F | 5.25 |
| 4-methoxy-Phenol, phosphate (3:1) | F | 4.58 |
| 4-methylphenyl diphenyl ester Phosphoric acid | F | 5.12 |
| octyl diphenyl ester Phosphoric acid | F | 5.18 |
| P-2-propen-1-yl-, bis(2-methoxyethyl) ester Phosphonic acid | F | 5.68 |
| 2-ethoxy-2,4,4,6,6-pentafluoro-2λ5,4λ5,6λ5-1,3,5,2,4,6-Triazatriphosphorine | F | 6.79 |
| 2,4,6-tris(trifluoromethyl)-1,3,5-Triazine | F | 7.52 |
| N-(diethoxyphosphinyl)-Phosphorimidic acid, triethyl ester | F | 5.39 |
| 6-ethenyl-6-(2-methoxyethoxy)-2,5,7,10-Tetraoxa-6-silaundecane | F | 5.87 |
| P-methyl-, bis(2,2,2-trifluoroethyl) ester Phosphonic acid | F | 6.81 |
| triphenyl ester Phosphorous acid | F | 4.93 |
| ethyl-, bis(2,2,2-trifluoroethyl) ester Phosphonic acid | F | 6.79 |
| 4,4'-(1-methylethylidene)bis[2,6-dibromo-Phenol | F | 4.79 |
| P,P'-1,3-phenylene P,P,P',P'-tetraphenyl ester Phosphoric acid | F | 5.21 |
| N,N,N',N'-tetraethyl-P-[(2-methoxyethoxy)methyl] Phosphonic diamide | F | 4.51 |
| 2-ethoxy-1,3,2-Dioxaphospholane, 2-oxide | F | 6.60 |
| triethyl ester Phosphoric acid | F | 6.37 |
| Phosphorodifluoridate (8CI, 9CI) | C | 5.96 |

Any of the disclosed embodiments may be implemented in lithium ion batteries to improve their cycle life, charging/discharging rates, safety and/or capacity. Lithium ion batteries typically comprise anodes and cathodes with current collectors affixed thereto, packed with electrolyte and separator(s) in a soft or/and hard package (e.g., pouches, prismatic or cylindrical packages, etc. Anodes are typically made of anode material particles and additional materials, such as conductive additive(s), binder(s), surfactants, dispersive materials, porosity control materials, etc., and may comprise any of the anode configurations taught, e.g., by U.S. Patent Publication No. 2017/0294687, incorporated herein by reference in its entirety. In certain embodiments, polymerization of the anode coating and/or of coatings of the anode material particles may be controlled, as disclosed, e.g., in any of U.S. Patent Publication No. 2019/0198912 and U.S. Patent Application Nos. 62/711,639 and 62/804,778, incorporated herein by reference in their entirety. For example, anodes may be based on carbon (e.g., graphite, graphene or other carbon-based materials), metalloid anode material such as Si, Ge, Sn and their combinations and/or metals such as Li-metal. Cathodes may comprise lithium metal oxide (LiMeO), wherein Me can be one or several metals selected from Ni, Co, Fe, Mn and Al or sulfur-based cathodes. For example, cathodes may comprise materials based on layered, spinel and/or olivine frameworks, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) lithium iron-phosphorus oxide (LFP) formulations (based on $LiFePO_4$), lithium rich cathodes, and/or combinations thereof. Cathodes may further comprise additive (e.g., conductive additives), binders, etc. Separator(s) may comprise various materials, e.g., polymers such as any of polyethylene (PE), polypropylene (PP), polyethylene terephthalate (PET), poly vinylidene fluoride (PVDF), polymer membranes such as a polyolefin, polypropylene, or polyethylene membranes. Multi-membranes made of these materials, micro-porous films and/or spray coating thereof, woven or non-woven fabrics etc. may be used as separator(s), as well as possibly composite materials including, e.g., alumina, zirconia, titania, magnesia, silica and calcium carbonate along with various polymer components as listed above.

In various embodiments, the electrolytes may be configured as any of liquid, polymer, gel (e.g., associated with inorganic silica gel electrolytes), glass (e.g., associated with amorphous sulfides-based electrolytes), solid polymer electrolytes (e.g., associated with polyethylene oxide, fluorine-containing polymers and copolymers such as polytetrafluoroethylene), polycrystalline inorganic solid electrolytes and/or combinations thereof. In certain embodiments, solid electrolytes may be used to coat the cathodes. Electrolytes may comprise lithium electrolyte salt(s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$), tris(trimethylsilyl)phosphite (TMSP), and combinations thereof. Ionic liquid(s) may be added to the electrolyte as taught by WIPO Publication No. WO 2018/109774, incorporated herein by reference in its entirety. In certain embodiments, electrolytes may comprise linear solvent comprising at least one three-carbon and/or four-carbon chain ester, cyclic carbonate solvent and at least one lithium salt, as disclosed e.g., in U.S. Patent Publication No. 2019/0148774, incorporated herein by reference in its entirety.

Disclosed lithium ion batteries (and/or respective battery cells thereof) may at least partly be configured, e.g., by selection of materials, to enable operation at high charging and/or discharging rates (C-rate), ranging from 3-10 C-rate, 10-100 C-rate or even above 100 C, e.g., 5 C, 10 C, 15 C, 30 C or more. It is noted that the term C-rate is a measure of charging and/or discharging of cell/battery capacity, e.g., with 1 C denoting charging and/or discharging the cell in an hour, and XC (e.g., 5 C, 10 C, 50 C etc.) denoting charging and/or discharging the cell in 1/X of an hour—with respect to a given capacity of the cell.

Figure 9:
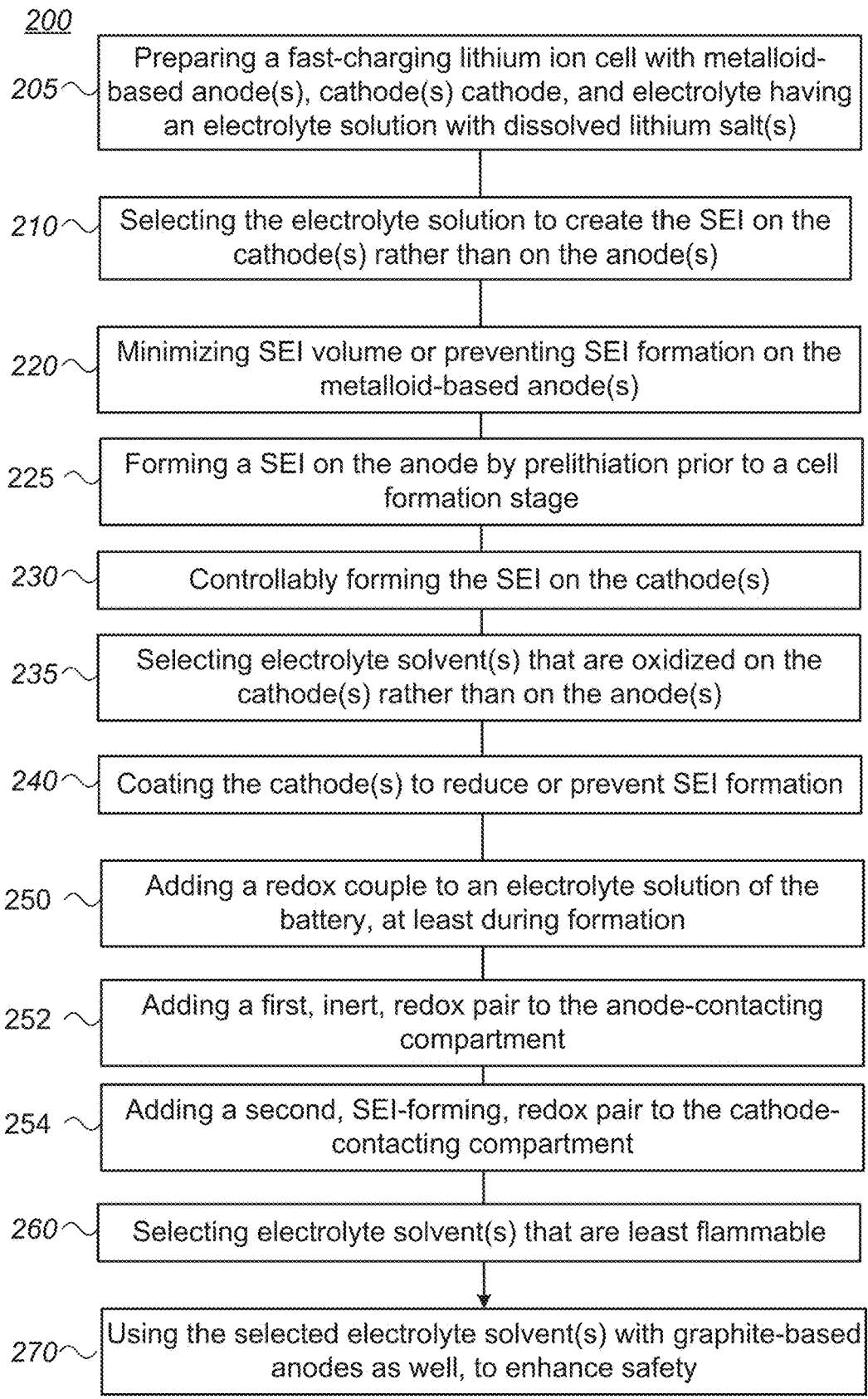
FIG. 9 is a high-level flowchart illustrating a method, according to some embodiments of the invention.

FIG. 9 is a high-level flowchart illustrating a method 200, according to some embodiments of the invention. The method stages may be carried out with respect to cells 100 described above, which may optionally be configured by implementing method 200. Method 200 may comprise the following stages, irrespective of their order. Method 200 may comprise preparing a fast-charging lithium ion cell with at least one anode made of metalloid anode active material comprising at least one of Si, Ge and Sn, at least one cathode, and electrolyte comprising an electrolyte solution and at least one dissolved lithium salt (stage 205); selecting the electrolyte solution to create, at least during a formation stage of the cell, a solid-electrolyte interphase (SEI) upon the at least one cathode rather than on the at least one anode (stage 210). Method 200 may further comprise minimizing SEI volume or preventing SEI formation on the metalloid-based anode(s) (stage 220). In certain embodiments, no SEI is formed on the anodes. Alternatively or complementarily, in certain embodiments method 200 may comprise forming a SEI on the at least one anode by prelithiation prior to a cell formation stage (stage 225). In certain embodiments, SEI is formed on the cathodes. In certain embodiments, no SEI is formed on the anodes or on the cathodes, e.g., by protection of the cathodes by coating(s).

In certain embodiments, method 200 may comprise forming the SEI on the cathode(s) in a controllable manner (stage 230). Method 200 may comprise selecting electrolyte solvent(s) that are oxidized on the cathode(s) rather than on the anode(s) (stage 235).

In certain embodiments, method 200 may further comprise coating the cathode(s) to reduce or prevent SEI formation thereupon (stage 240).

In certain embodiments, method 200 may further comprise adding a redox couple to an electrolyte solution of a fast-charging lithium-ion battery, at least during a formation process thereof (stage 250), e.g., by adding a first redox pair in an anode-contacting compartment (stage 252) and adding a second redox pair in a cathode-contacting compartment (stage 254). The first redox pair may be inert with respect to at least one anode of the battery and the second redox pair may form a solid electrolyte interphase (SEI) on at least one cathode of the battery during at least the formation process thereof.

In certain embodiments, method 200 may further comprise selecting electrolyte solvent(s) that are least flammable (stage 260), and possibly using the selected electrolyte solvent(s) with graphite-based anodes as well, to enhance safety (stage 270).

Figure 10A:
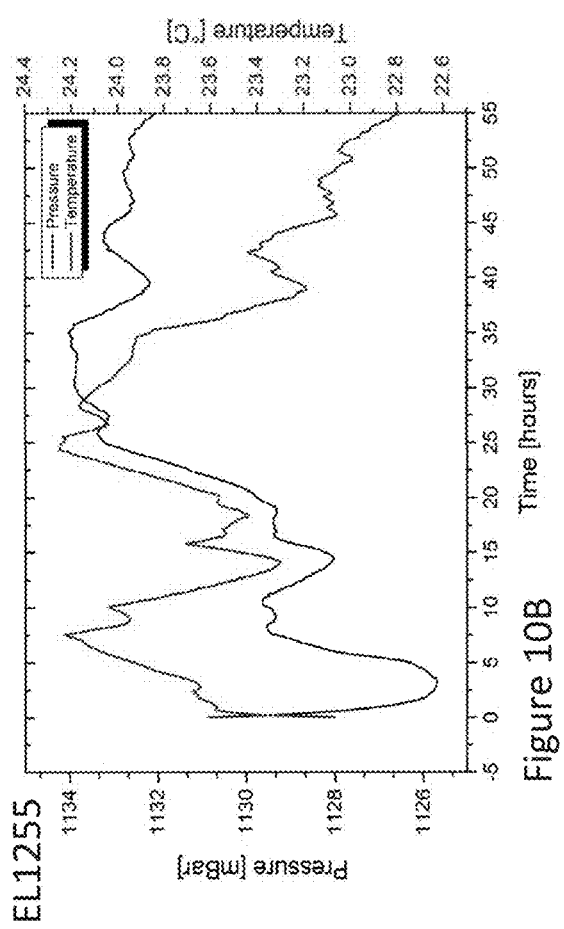
FIGS. 10A-10D and 11 illustrate, experimentally, advantages of disclosed electrolyte solutions, according to some embodiments of the invention.

FIG. 10A illustrates an anode potential [V versus Li/Li$^+$] (y-axis) versus time (x-axis) of a EL1255 electrolyte.

Figure 10B:
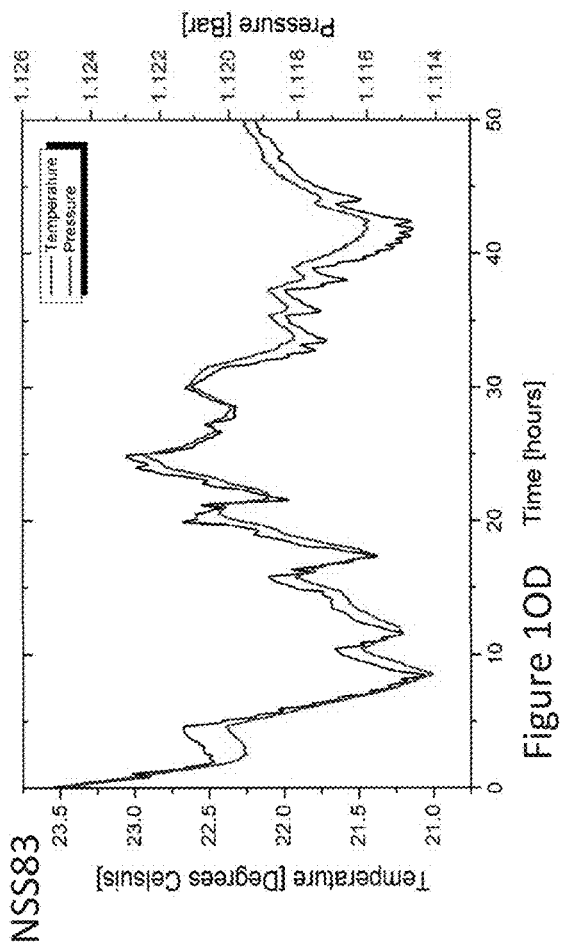

FIG. 10B illustrates an anode potential (y-axis) versus time (x-axis) of a NSS83 electrolyte formed according to an embodiment of the invention.

Figure 10C:
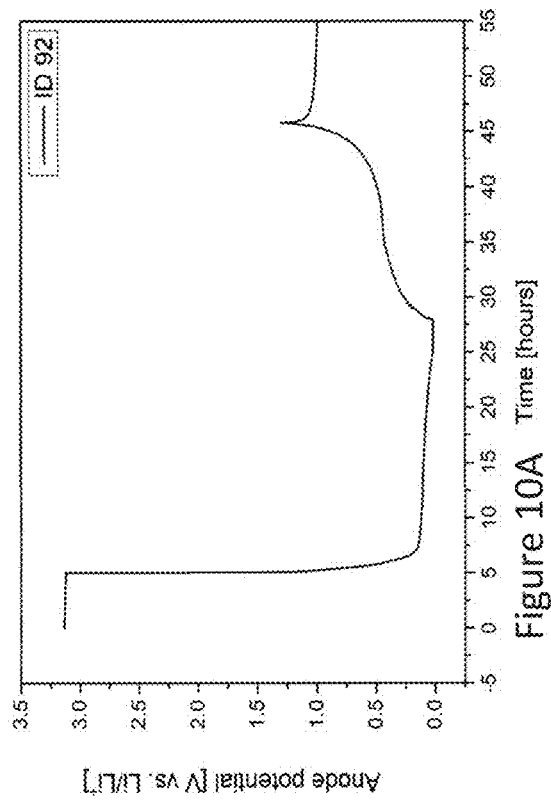

FIG. 10C illustrates a pressure and temperature (right and left y-axes) versus time (x-axis) of a EL1255 electrolyte.

Figure 10D:
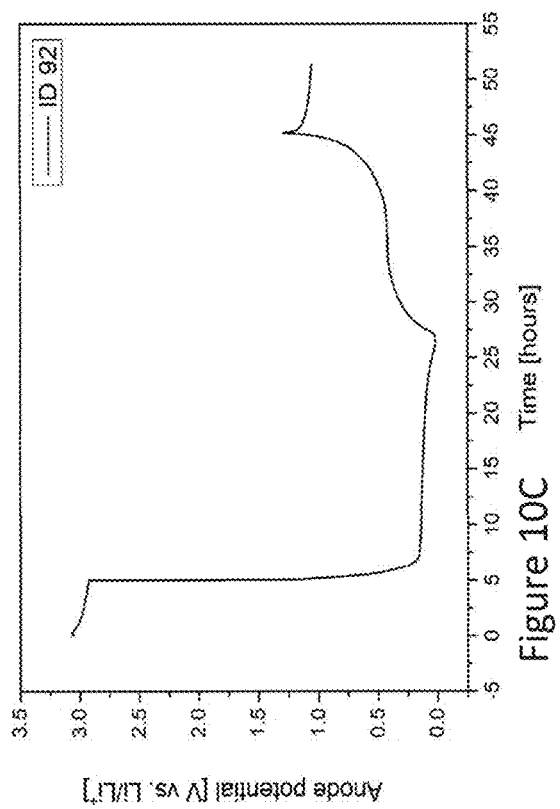

FIG. 10D illustrates a pressure and temperature (right and left y-axes) versus time (x-axis) of a NSS83 electrolyte formed according to an embodiment of the invention.

Figure 11:
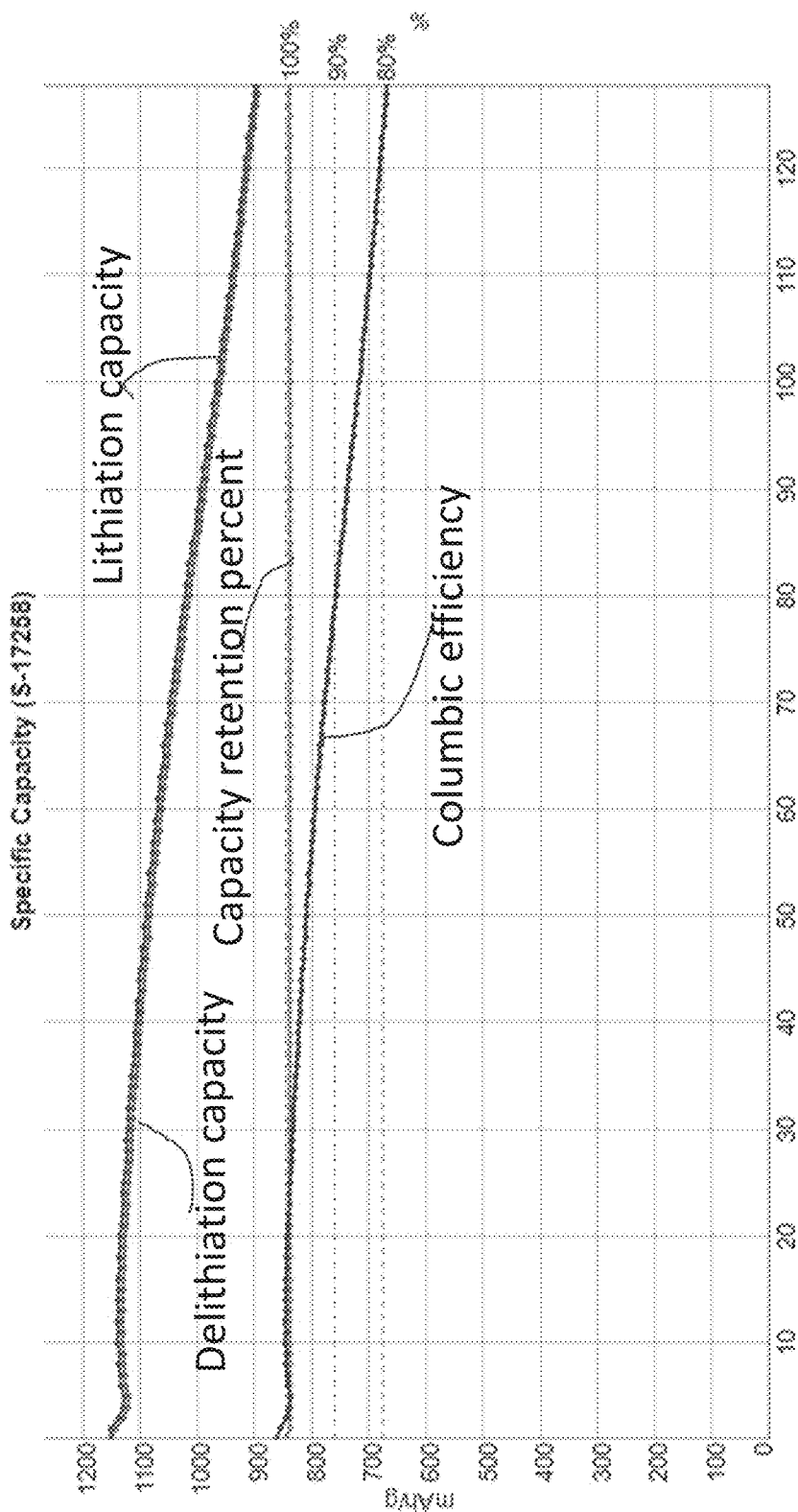

FIG. 11 illustrates a graph that illustrates a lithiation capacity, a delithiation capacity, a capacity retention percent and a columbic efficiency of an electrolyte formed according to an embodiment of the invention.

FIGS. 10A-10D and 11 illustrate that an electrolyte according to an embodiment of the invention reduces gas formation on the anode during charging.

FIG. 11 also illustrates that an electrolyte according to an embodiment of the invention provides a fast charging anode with long cyclability.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A lithium ion cell comprising:
   a cover,
   at least one separator,
   at least one anode made of metalloid anode active material comprising at least one of Si, Ge and Sn,
   at least one cathode,
   a solid-electrolyte interphase (SEI) that is formed upon the at least one cathode, and
   electrolyte comprising an electrolyte solution and at least one dissolved lithium salt; wherein the electrolyte solution comprises a redox couple, the redox couple comprises (i) a first redox pair between an anode of the least one anode and a separator of the at least one separator, and (ii) a second redox pair between a cathode of the at least one cathode and the separator;
   wherein:
   the at least one anode and the at least one cathode are enclosed with the electrolyte and the at least one separator within the cover, and
   the electrolyte solution is selected to create, at least during a formation stage of the lithium ion cell, the SEI upon the at least one cathode and to prevent a creation of the SEI on the at least one anode.

2. The lithium ion cell of claim 1, wherein the electrolyte solution comprises at least one additive having an oxidation potential of 3.0V or more with respect to Li/Li$^+$.

3. The lithium ion cell of claim 1, wherein the at least one cathode is coated.

4. The lithium ion cell of claim 1, wherein the electrolyte solution comprises at least one of sulfolane, NMP, DME, triglyme and tetraglyme, at least one lithium salt comprising LiFSI (Lithium bis(fluorosulfonyl)imide), LiTFSI (lithium bis(trifluoromethanesulfonyl)imide), LiBOB (lithium bis (oxalato)borate) and LiFOB (lithium difluoro(oxalato)borate) and/or $LiPF_6$.

5. The lithium ion cell of claim 1, further comprising, as additive, at least one of: N,N-dimethyl-Benzenamine, 5-dimethyl-Furan, N,N-diethyl-1,1,1-trimethyl-Silanamine, 1,4-bis(1,1-dimethylethyl)-2,5-dimethoxy-Benzene, 1,4-Benzodioxin-6,7-diol, 2,3-dihydro and/or 10H-Phenothiazine, 10-phenyl.

6. The lithium ion cell of claim 1, wherein the electrolyte solution comprises DEE (1,2-diethoxyethane) with at least one of: LiFSI, LiTFSI, LiBOB and LiFOB as additive.

7. The lithium ion cell of claim 1, wherein the at least one cathode is made of NMC cathode active material.

8. The lithium ion cell of claim 1, exhibits a charging rate that exceeds 4 C.

9. The lithium ion cell according to claim 1, wherein the first redox pair is inert with respect to the anode.

10. The lithium ion cell according to claim 1, wherein the redox couple comprises vanadium.

11. The lithium ion cell according to claim 1, wherein the first redox pair comprising $V^{3+}$ and $V^{2+}$, wherein the second redox pair comprising $V^{4+}$ and $V^{5+}$.

12. A lithium ion cell comprising:
a cover,
at least one separator,
at least one anode made of metalloid anode active material comprising at least one of Si, Ge and Sn,
at least one coated cathode, and
electrolyte comprising an electrolyte solution and at least one dissolved lithium salt; wherein the electrolyte solution comprises a redox couple, the redox couple comprises (i) a first redox pair between an anode of the least one anode and a separator of the at least one separator, and (ii) a second redox pair between a cathode of the at least one cathode and the separator; wherein:
the at least one anode and the at least one coated cathode are enclosed with the electrolyte and the at least one separator within the cover, and
the electrolyte solution is selected to be unreactive, at least during a formation stage of the cell, towards the at least one anode and towards the at least one coated cathode, to prevent formation of a solid-electrolyte interphase (SEI) thereupon to provide a lithium ion cell without the SEI.

13. The lithium ion cell according to claim 12, wherein the first redox pair is inert with respect to the anode.

14. The lithium ion cell according to claim 12, wherein the redox couple comprises vanadium.

15. The lithium ion cell according to claim 12, wherein the first redox pair comprising $V_{3+}$ and $V^{2+}$, wherein the second redox pair comprising $V^{4+}$ and $V^{5+}$.

16. A method comprising:
preparing a lithium ion cell, wherein the preparing of the lithium ion cell comprises forming, at least during a formation stage of the lithium ion cell, a solid-electrolyte interphase (SEI) upon the at least one cathode while preventing a creation, during the formation stage, of the SEI on the at least one anode;
wherein the lithium ion cell comprises a cover, at least one separator, the at least one anode made of metalloid anode active material comprising at least one of Si, Ge and Sn, the at least one cathode, and electrolyte comprising an electrolyte solution and at least one dissolved lithium salt; wherein the electrolyte solution comprises a redox couple, the redox couple comprises (i) a first redox pair between an anode of the least one anode and a separator of the at least one separator, and (ii) a second redox pair between a cathode of the at least one cathode and the separator; wherein the electrolyte solution is selected for the creating, at least during the formation stage of the lithium ion cell, the SEI upon the at least one cathode and to prevent the creation of the SEI on the at least one anode during at least the formation stage.

17. The method of claim 16, wherein the forming of the SEI on the at least one cathode is executed in a controllable manner.

18. The method of claim 16, further comprising forming a SEI on the at least one anode by prelithiation prior to the formation stage of the ion lithium cell.

19. The method according to claim 16, wherein the first redox pair is inert with respect to the anode.

20. The method according to claim 16, wherein the redox couple comprises vanadium.

21. The method according to claim 10, wherein the first redox pair comprising $V^{3+}$ and $V^{2+}$, wherein the second redox pair comprising $V^{4+}$ and $V^{5+}$.

* * * * *